R. C. OSGOOD.
AXLE BOX.
APPLICATION FILED MAY 28, 1920.
1,399,398.
Patented Dec. 6, 1921.
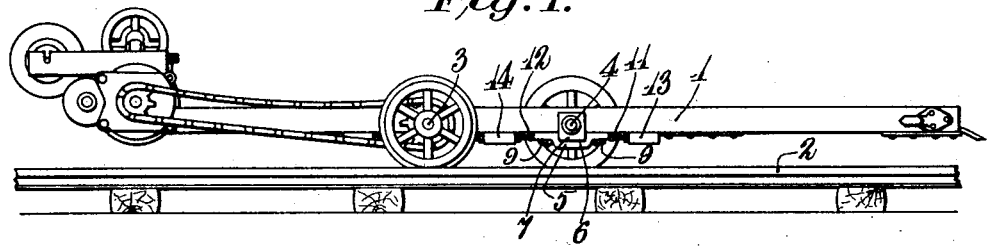
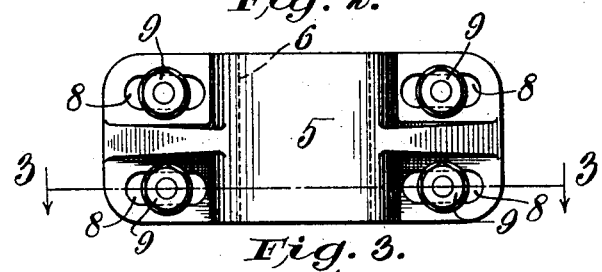
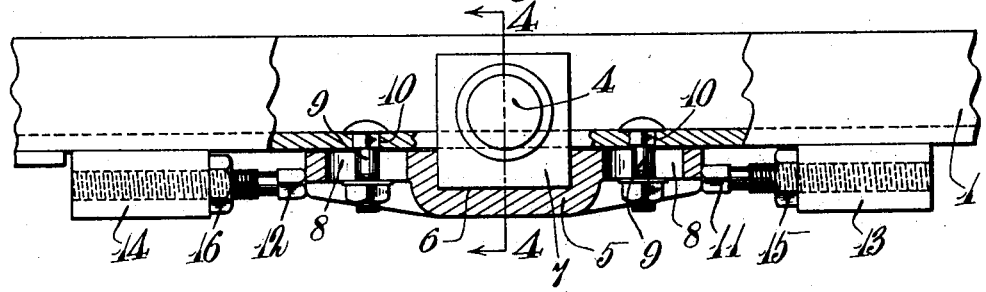
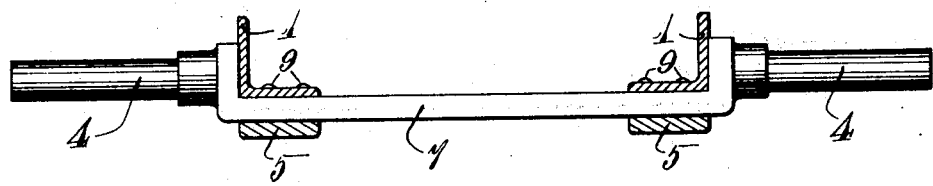
Inventor:
Robert C. Osgood.
by
Atty.

UNITED STATES PATENT OFFICE.

ROBERT C. OSGOOD, OF CLAREMONT, NEW HAMPSHIRE, ASSIGNOR TO SULLIVAN MACHINERY COMPANY, A CORPORATION OF MASSACHUSETTS.

AXLE-BOX.

1,399,398.  Specification of Letters Patent.  Patented Dec. 6, 1921.

Application filed May 28, 1920. Serial No. 385,011.

*To all whom it may concern:*

Be it known that I, ROBERT C. OSGOOD, a citizen of the United States, residing at Claremont, in the county of Sullivan and State of New Hampshire, have invented certain new and useful Improvements in Axle-Boxes, of which the following is a full, clear, and exact specification.

My invention relates to axle boxes.

It has for its object to provide an improved axle box construction especially adapted to use in connection with axles of the drop axle type. A further object of my invention is to provide an improved axle box construction whereby the requisite drop in the axle of a drop axle truck is minimized at the same time that boring of the axle is also eliminated and a rigid connection is provided which permits the parts to be readily and securely assembled or readily removed for replacement when necessary.

In the accompanying drawings I have shown for purposes of illustration, one embodiment which my invention may assume in practice, the same being illustrated as applied to a mining machine truck.

In these drawings,—

Figure 1 is a side elevation of such a truck equipped with my improvement, one front wheel being removed to facilitate illustration.

Fig. 2 is an enlarged detail bottom plan view of an axle box.

Fig. 3 is an enlarged sectional view on line 3—3 of Fig. 2, the box being shown on the truck and a portion of the latter being broken away to facilitate illustration.

Fig. 4 is a sectional view on the line 4—4 of Fig. 3, showing the drop axle in elevation and the truck frame and a plurality of axle boxes in section.

In this illustrative construction I have shown a truck 1 adapted to receive a mining machine and to transport the same from place to place over rails 2, the truck shown being of the so called drop axle type, adapted to use in mines where there is little head room, and having its axles connected to the truck body by improved means.

In my improved construction, the front and rear axles 3 and 4 and the axle boxes for the opposite ends of each, are preferably of identical construction so that a description of one axle and its axle box will suffice for all. Referring more particularly to the axle box illustrated in Figs. 2 and 3, it will be noted that the same comprises a box member 5 having a transversely extending groove 6 between its ends of slightly less depth than that of the body 7 of the axle member 4 and adapted to receive said body at a point inside one of the drop portions thereon. As shown, this box member 5 is also provided with longitudinally slotted ends 8 adapted to receive clamping bolts 9 extending upward through suitable apertures 10 in the bottom of the truck. Further it will be noted that the box is held in position by a plurality of screws 11 and 12 which are threadedly engaged in blocks 13 and 14, these blocks being provided with suitable threaded longitudinally extending apertures to receive the screws 11 and 12. These screws are held definitely in any relative position to the members 13 and 14 by lock nuts 15 and 16. Thus, it is possible by tightening the bolts 9 to securely clamp the axle to the bottom of the frame 1 in any desired longitudinal position of adjustment of the box and axle, and by screwing out and locking the screws 11 and 12 so that they coöperate with the box clamping bolts 9 also hold the box against longitudinal movement.

By this improved construction, it will be observed that it is possible to provide a construction wherein without in any way sacrificing compactness of the truck, the difficult U-shaped so called "drop" of the axle is reduced in depth in such a manner as materially to facilitate the forging operation. It will also be observed that through the provision of the clamping means set forth, all necessity for boring and thereby weakening the drop axles is obviated at the same time that an exceedingly rigid and strong construction is produced which is capable of being readily replaced when desired.

While I have in this application specifically described one embodiment which my invention may assume in practice, it will be understood that the same is used for illustrative purposes and that my invention may be modified and embodied in other forms without departing from its spirit or the scope of the appended claims.

What I claim as new and desire to secure by Letters Patent is:

1. In combination, a frame, a drop axle disposed beneath the same, an axle box having a recess of less depth than that of the drop portion of said axle receiving the bottom of said portion, and means exterior to said axle for clamping said box to said frame.

2. In combination, a frame, a drop axle disposed beneath the same, an axle box having a groove of less depth than that of the drop portion of said axle receiving the bottom of said portion, said box having lateral extensions, and means for clamping said extensions to said frame.

3. In combination, a frame, a drop axle disposed beneath the same, an axle box having a recess of less depth than that of the drop portion of said axle receiving the bottom of said portion, said box having lateral extensions, and means extending through said extensions and the frame for clamping the box and axle to said frame.

4. In combination, a frame, a drop axle having its drop portion snugly fitted thereon, axle boxes having grooves therein of less depth than the depth of the drop portion of said axle and receiving the latter at points on opposite sides of said frame and said drop portion, and means external to said axle for clamping said boxes and axle to said frame.

5. In combination, a frame, a drop axle disposed beneath the same, an axle box having a recess formed in the upper surface thereof and receiving the drop portion of said axle, and means extending between said frame and said box for causing the latter to rigidly clamp said axle to said frame.

6. In combination, a frame, a drop axle disposed beneath the same, an axle box having a recess formed in the upper surface thereof and receiving the drop portion of said axle, and means extending between said frame and said box for causing the latter to rigidly clamp said axle to said frame, said means comprising members operative to adjust the position of said box longitudinally of said frame and to lock it in any adjusted position.

7. In combination, a frame, a drop axle disposed beneath the same, an axle box having a recess formed in the upper surface thereof and receiving the drop portion of said axle, means operative when in one position to permit longitudinal movement of said box relative to the frame, said means being operative in another position to cause said box to clamp said axle rigidly to the frame, and adjustable means for moving said box longitudinally of the frame when said first mentioned means is in its first mentioned position, said second mentioned means being also adjustable to lock said box against longitudinal movement relative to said frame.

In testimony whereof I affix my signature.

ROBERT C. OSGOOD.